United States Patent [19]
Frey et al.

[11] 3,827,844
[45] Aug. 6, 1974

[54] APPARATUS FOR MAKING TIRES

[75] Inventors: Walter C. Frey, Akron; Claude Mullender, Barberton; Norman E. Reinhart, Cuyahoga Falls, all of Ohio

[73] Assignee: The B. F. Goodrich Company, New York, N.Y.

[22] Filed: Feb. 5, 1973

[21] Appl. No.: 329,716

[52] U.S. Cl................ 425/142, 425/315, 425/377, 156/500, 242/110.1
[51] Int. Cl..................... B29d 31/00, B29f 3/00
[58] Field of Search ............ 425/29, 140, 315, 377; 156/244, 500; 264/176 R; 242/110.1 X; 279/114

[56] References Cited
UNITED STATES PATENTS

| | | |
|---|---|---|
| 1,276,821 | 8/1918 | Stevens........................... 156/244 X |
| 1,330,886 | 2/1920 | MacBeth et al. ................ 156/500 X |
| 1,370,943 | 3/1921 | Boyd et al........................ 279/114 X |
| 1,456,525 | 5/1923 | West................................ 279/114 X |
| 1,495,362 | 5/1924 | Straub.............................. 156/500 X |
| 2,726,922 | 12/1955 | Merrill et al........................ 425/140 |
| 3,332,819 | 7/1967 | Siempelkamp.................. 425/315 X |

*Primary Examiner*—R. Spencer Annear
*Attorney, Agent, or Firm*—Joseph Januszkiewicz

[57] ABSTRACT

An apparatus for making solid tires by utilizing an extruder that directs a predetermined length of strip of rubber onto a rotating chuck that supports a rim which is rotated at a preset speed in accordance with the diameter of the rim.

9 Claims, 8 Drawing Figures

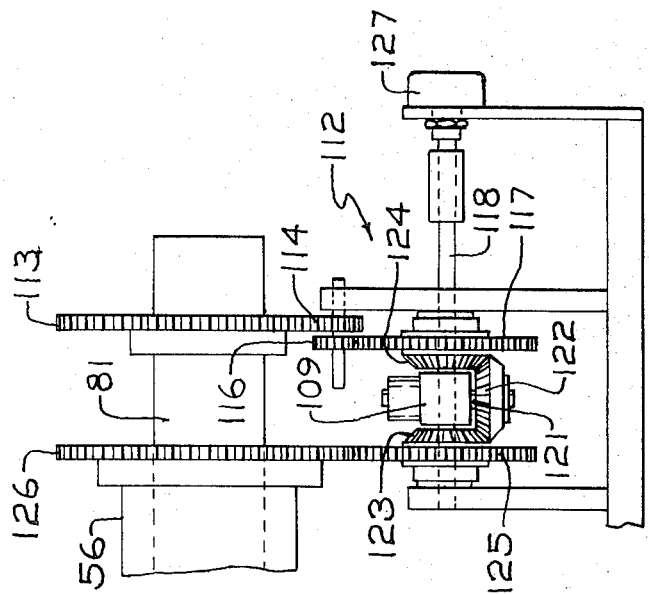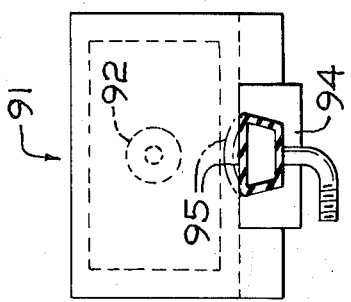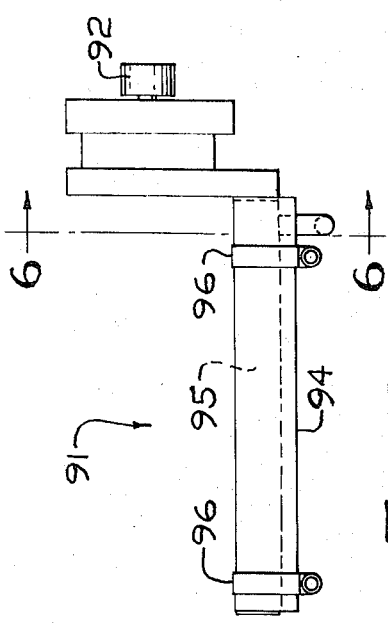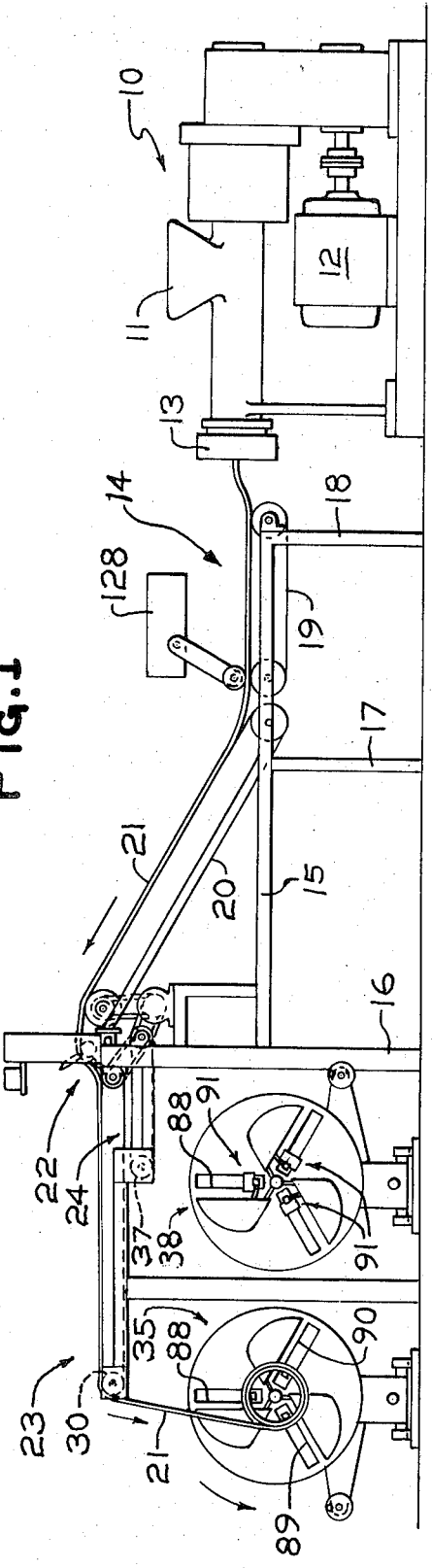

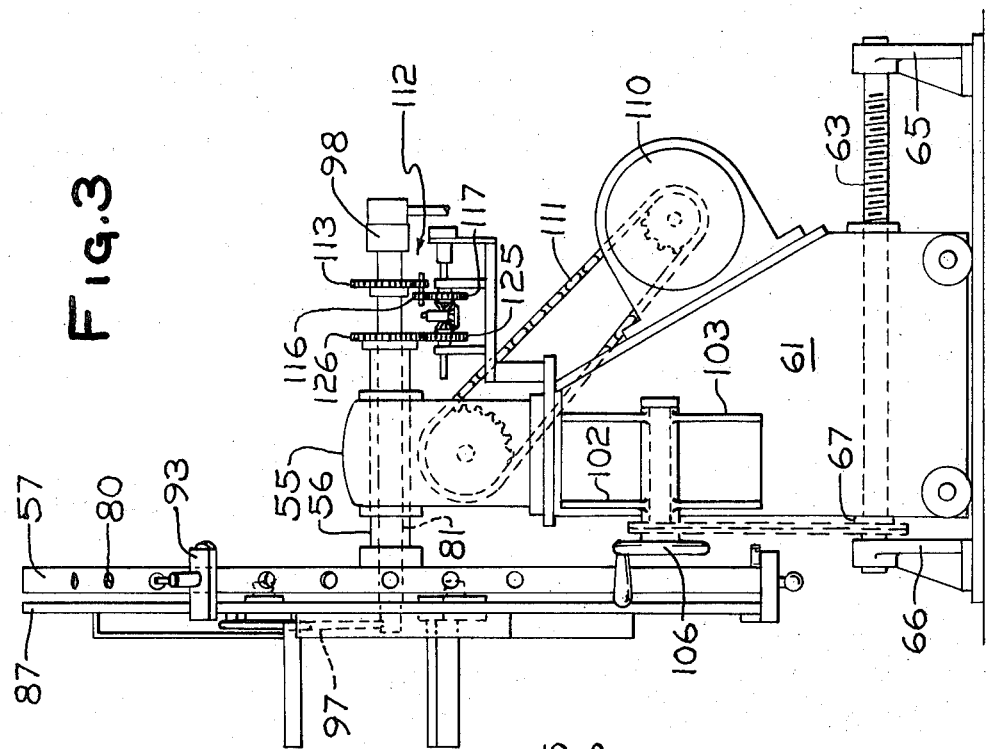
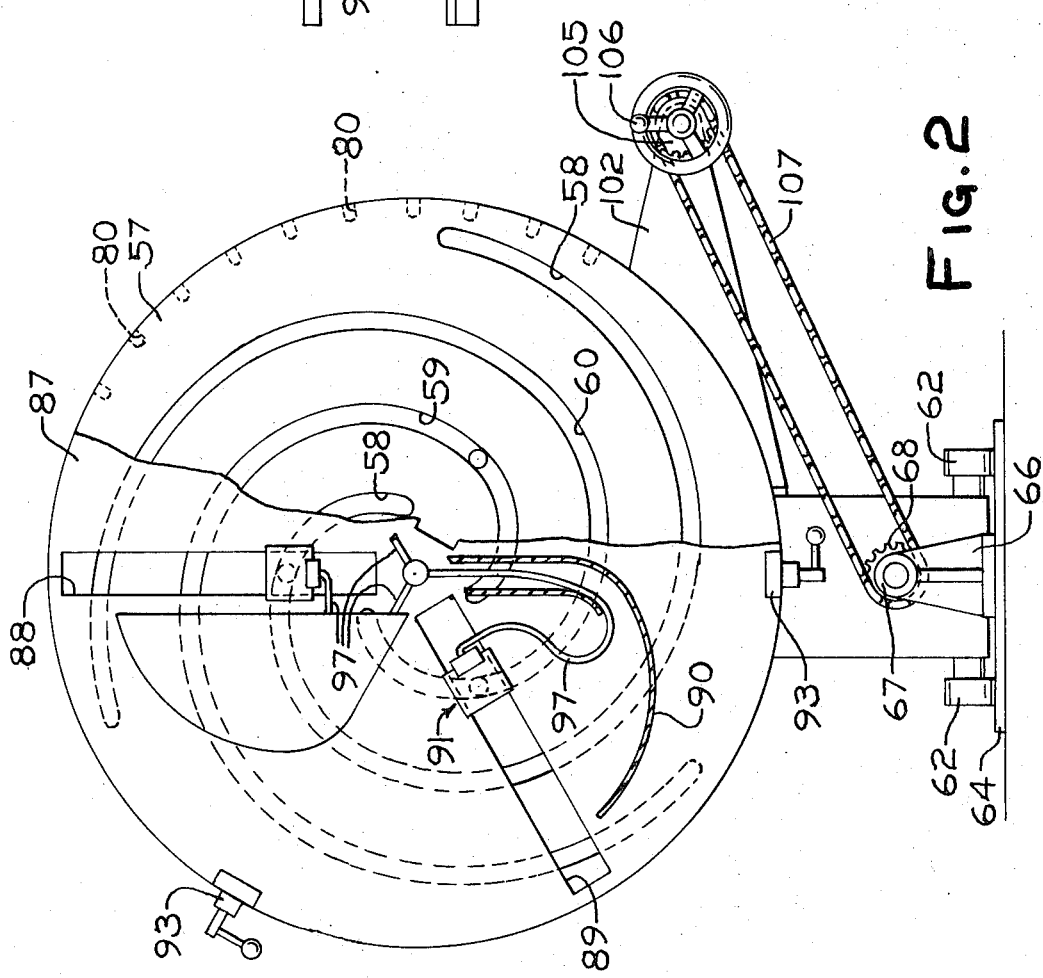

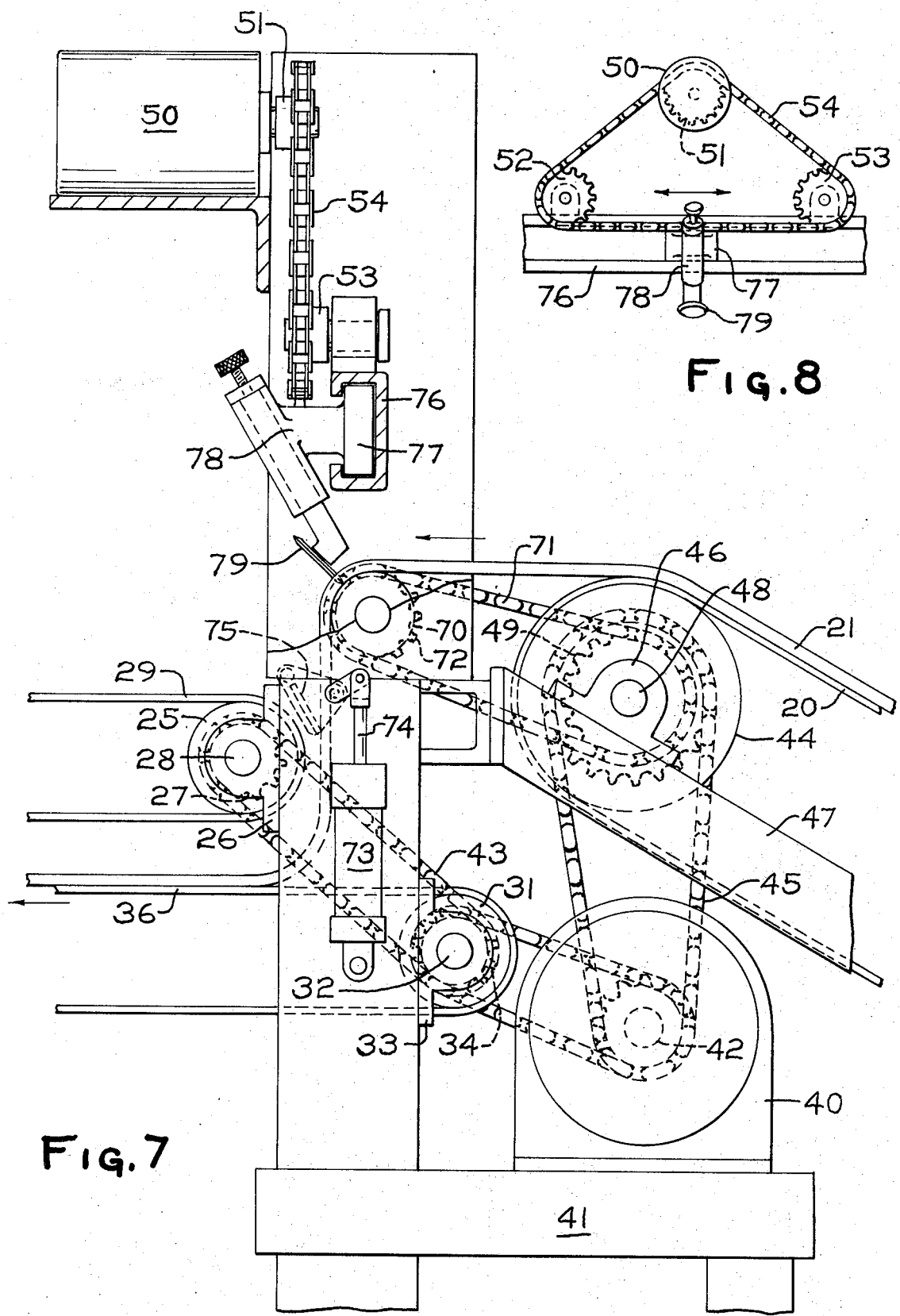

3,827,844

APPARATUS FOR MAKING TIRES

BACKGROUND OF THE INVENTION

This invention relates to an apparatus for making solid tires.

In the manufacture of solid tires which are vulcanized and integral with a wheel rim, it has been common practice to cut predetermined lengths of slabs of elastomeric stock and thence place such stock onto a tire rim abutting the respective ends of the stock. Since such stock is not contoured cross-sectionally to the shape of the finished tire because such is not practical, it is necessary in the molding process to flow the material into the desired shape. It has been the practice to provide an excess of material to assure that the mold is completely filled, with the excess forming a flash. The flashing has been excessive and costly. The problem of flowing such stock is accentuated at the juncture of the ends because such stock in the case of small diameter wheel with relatively large cross-sectional area is difficult to bend and conform to the rim. One method of preparing stock is to extrude an annular stock, cut such stock into predetermined lengths wherein each length is a circumference of a tire; however, since the length at the rim is less than the length at the outer circumferential edge, there is an excess of material at the inside circumference compared to the outer circumference, thus requiring an excess of stock.

SUMMARY OF THE INVENTION

The present invention is directed to a new and improved apparatus for making solid tires wherein an extruder directs a predetermined measured amount of material to a rotating rim whose speed of rotation is adjusted automatically in accordance with the diameter of rim onto which the elastomeric material is wound.

BRIEF DESCRIPTION OF DRAWINGS

FIG. 1 is a side elevational view of the apparatus;

FIG. 7 is an enlarged side elevational view of the cutter and diverter mechanism;

FIG. 2 is an enlarged side elevational view of the chuck wind-up mechanism of the invention with a portion broken away;

FIG. 3 is an enlarged front elevational view of the chuck wind-up mechanism shown in FIG. 2;

FIG. 4 is an enlarged fragmentary view of motor control means of the wind-up mechanism;

FIG. 5 is an enlarged view of one of the clamping means of the chuck wind-up mechanism;

FIG. 6 is an enlarged view of the clamping means taken on line 7—7 of FIG. 5;

FIG. 8 is a fragmentary front view of the drive means for the cutter mechanism.

DETAILED DESCRIPTION

Referring to the drawings, wherein like reference characters designate like or corresponding parts throughout the several views, there is shown in FIG. 1 an extruder 10 having a hopper 11, motor 12, and a die head means 13. Mounted adjacent to extruder 10 is a conveyor means 14 suitably supported by cross braces 15, and pairs of vertical supports 16, 17 and 18. Conveyor means 14 has a pair of endless conveyor belt 19 and 20 which convey the extrudate 21 from extruder 10 upwardly to a diverter means 22.

Mounted adjacent to diverter means 22 are a pair of endless conveyors 23 and 24. Conveyor 23 includes a driven roller 25 (FIGS. 7 and 1) supported on a pair of journal means 26 which are secured to vertically extending supports 16 (only one shown in FIG. 1). A sprocket 27 is keyed to the outboard end of a shaft 28 which supports roller 25. An endless belt 29 is trained about roller 25 and an idler roller 30 to deliver stock to a chuck means 35.

Conveyor 24 includes a driven roller 31 secured to a shaft 32 journaled for rotation on journal means 33 that is secured to vertically extending supports 16. A sprocket 34 is keyed to the outboard end of shaft 32. An endless conveyor 36 is trained about driven roller 31 and an idler roller 37 to deliver stock to a chuck means 38.

A motor 40 mounted on a bracket 41 that is secured to one of the vertical supports 16 has its output shaft 42 connected to sprocket 34 to control driven rollers 25 and 31. Rollers 25 and 31 have their sprockets 27 and 34 interconnected by a sprocket chain 43. The output of motor 40 is also connected to a drive roll 44 via a belt drive 45. Drive roll 44 operates to orbit endless conveyor belt 20 to convey the extrudate 21 for processing. Drive roll 44 is mounted for rotation on journals 46 which are secured to brackets 47 that are suitably secured to the vertically extending supports 16 and 17. A shaft 48, keyed to roll 44, has its outboard end keyed to a sprocket 49, which sprocket 49 drives a roller 70 via chain 71 and sprocket 72. Roll 44 transfers the extrudate 21 from the conveying run of belt 20 selectively to either belt 29 or 36. This is accomplished by the diverter transfer means 22 which includes a pneumatic cylinder 73 secured to support 16 having its piston rod 74 pivotally connected to a transversely extending plate 75 that is suitably pivotally connected to the pair of supports 16. Actuation of the head end of cylinder 73 pivots plate 75 in a counterclockwise direction as viewed in FIG. 7 to direct the extrudate onto belt 29 in a manner to be described, while pressurization of the rod end of pivots plate 75 to the position shown in FIG. 7.

A horizontally extending guideway 76 is suitably secured to the upper end portions of spaced vertically extending supports 16. A roller 77 is captively retained in guideway 76 for linear reciprocable movement. Roller 77 is mounted for rotation from housing 78, which housing 78 carries a rotary cutter 79. A rotary actuator 50 suitably supported by brackets that are secured to supports 16 has its output connected to a sprocket 51. A pair of chain sprockets 52 and 53 are rotatably journaled on vertical supports 16. A chain 54, trained about sprockets 51, 52 and 53, is connected to housing 78 such that actuation of air actuator 50 reciprocates cutter 79 in a first linear direction across roll 70 while its second actuation moves the cutter 79 across roll 70 to its original position such that on each pass the cutter 79 severs the extrudate so that diverter means 22 can direct the next succeeding strip of extrudate to either belt 29 or 36. The air actuator 50 provides a rotary motion either clockwise or counterclockwise to sprocket 51. Such air actuators are available as purchased items and are sold by Rotac (Ex-Cello Corp.) and located at Greenville, Ohio.

The respective chuck means 35 and 38 are identical in construction and only one will be described. Chuck means 38 is mounted on a carriage means 61 which has a plurality of rollers 62 that are adapted to guide the carriage 61 on suitable guide means or rails. A lead screw 63 has its respective ends secured to brackets 65,66. A nut 67 journaled for rotation on carriage means 61 threadedly engages lead screw 63 and upon rotation thereof reciprocates carriage means 61 in accordance with the direction of rotation of screw 63. A sprocket 68 is keyed to nut 67 for rotation therewith. Carriage means 61 includes a platform 69 on which is mounted a transmission means 55. The transmission means 55 has its output connected to a hollow shaft 56, which shaft 56 is connected to a cam disc member 57. Disc member 57 has a plurality of cam grooves 58,59 and 60 that radiate outwardly from the center portion. The peripheral edge of disc member 57 has a plurality of circumferentially spaced bores 80 for a purpose to be described. Output shaft 56 is hollow and journaled for rotation therethrough a shaft 81. Rotatably keyed to the shaft 81 adjacent to cam disc member 57 is a plate member 87, which plate member 87 has three radially extending slots 88-89-90 which are guideways for jaws or brackets 91, with one jaw 91 in each guideway. Each jaw 91 has a rearwardly extending cam follower 92 which rides in one of the cam grooves or slots 88-89-90 such that rotation of plate member 87 relative to cam disc 57 causes the respective jaws 91 to move radially outwardly. A plurality of clamp means 93 are counted on plate member 87 such that a pin in clamp means 93 is operative to engage one of the bores 80 to prevent relative rotation between plate member 87 and cam disc 57. Each jaw 91 has a horizontally extending bracket 94 on which is secured an inflatable tube 95 as by straps 96. The respective tubes 95 are connected to a suitable pressure source via conduits 97 and a rotary union 98 with suitable valve means to control the pressurization and deflation of tubes 95.

A pair of spaced brackets 102, 103, suitably secured to carriage 61, have a sprocket 105 journaled thereon. A handwheel 106 is suitably keyed to the shaft that supports sprocket 105. A chain 107 is trained about sprockets 68 and 105 to provide means for rotating sprocket 68 and nut 67 which, in turn, moves carriage 61 longitudinally. A motor 110 is mounted on the rear portion of carriage 61 and has its output connected via a chain drive 111 to the transmission means 55. A differential gear unit 112 to be described has its respective bevel gears connected to hollow shaft 56 and shaft 81. Shaft 81 has a spur gear 113 keyed thereto, which gear 113 meshes with a gear 114 keyed to a shaft 115. A spur gear 116, keyed to shaft 115, meshes with a spur gear 117 of the differential unit 112, which unit 112 has a shaft or bar 118 extending therethrough and keyed to a spider block 120 that in turn is secured to a shaft 121 that rotatably journals thereon spider gear 122. Differential unit 112 has bevel gears 123 and 124 meshing with spider gear 122. Bevel gear 123 is secured to spur gear 125, which meshes with gear 126, which gear 126 is secured to hollow shaft 56. Rotation of shaft 56 relative to shaft 81 rotates shaft 118 to which is attached a potentiometer 127 which, in turn, controls the speed of motor 110. When shafts 56 and 81 are rotated together, at the same speed, shaft or bar 118 remains stationary and the speed of motor 110 is at a predetermined constant rate. Where, however, clamp means 93 permits relative rotation between cam disc 57 and plate member 87, then rotation of plate 87 relative to disc 57 will cause the cam followers 92 to ride radially outwardly or inwardly in grooves 58, 59 or 60 in accordance with the direction of rotation which, in turn, moves the respective jaws 91 outwardly or radially inwardly, which action also rotates shaft 118 which, in turn, sets potentiometer 127 to the desired speed for the position of jaws 91.

In the operation of the apparatus described, the operator sets the radial position of the jaws 91 as described above such that the diameter of a rim of a wheel onto which an elongated strip of rubber is to be wound fits snugly thereon. As mentioned above, the radial movement of brackets or jaws 91 moves plate 87 relative to disc 57 which rotates shaft 118 and thereby sets the potentiometer 127 for the desired speed of motor 110. Tubes 95 are inflated to securely fasten the rim to be wound onto the brackets or jaws 91. As the extruder deposits its extrudate onto conveyor means 14, a measuring unit 128 gauges the precise amount of material conveyed thereby and actuates at the preset time, motor 50 which moves cutter 79 rapidly across the endless conveyor to sever the extrudate 21 while simultaneously therewith cylinder 73 is actuated to divert the extrudate from belt 36 (FIG. 2) to belt 29. The next signal from measuring unit 128 actuates cylinder 73 by pressurizing the rod end of cylinder 73 and connecting to exhaust the head end of cylinder 73 where thereby pivots plate 75 to the position shown in FIG. 2 which thereby diverts the extrudate to belt 29. With this procedure, the operator is able to remove the wound rim from the chuck means 35 and position an empty rim thereon while chuck means 38 receives a supply of strip rubber thereon while it is being rotated by motor 110 at the preset speed in accordance with the diameter of the rim. By the manipulation of handlewheel 106 the carriage means 61 which supports the chucks 35 and 38 can be adjusted laterally to position the chucks 35 and 38 to receive different sizes of widths of stock.

Although a specific embodiment and a preferred mode of operation of the invention has been hereinafter described, it is understood that the subject invention is not limited thereto since variations and modifications thereof can be made without departing from the principles of the invention.

We claim:

1. An apparatus for winding strip materials onto a wheel rim to form a solid tire comprising an extruder, chuck means for mounting a wheel rim, drive means connected to said chuck means for rotating said chuck means, conveyor means for conveying a strip of material from said extruder to said chuck means, cutter means located adjacent to said conveyor means for severing said extrudate upon actuation thereof, measuring means operative to measure the amount of extrudate issuing from said extrudate and operative to actuate said cutter means to provide a preselected amount of extrudate for said chuck means, said chuck means comprises a pair of chucks, each chuck having radially moveable brackets for adjusting the diameter size of the wheel rim received by said brackets, and control means responsive to the radial position of said bracket to control the speed output of said drive means.

2. An apparatus as set forth in claim 1 wherein said conveyor means includes a pair of endless conveyors, each of said endless conveyors has a conveying run, one of said conveying runs has its one end aligned with one of said pairs of chucks to deposit an extrudate strip thereto, and the other of said conveying runs has one end aligned with the remaining one of said pairs of chucks to deposit an extrudate thereto, and diverter means mounted adjacent to said cutter means and responsive to actuation of said cutter means to alternate the movement of said extrudate onto one or the other of said pair of endless conveyors.

3. An apparatus as set forth in claim 2 wherein each of said chucks comprises a rotatable disc having a plurality of spiral cam grooves therein, a plate member journaled for rotation relative to said disc, lock means interconnecting said disc and plate for locking said disc and said plate together or for unlocking and permitting relative movement therebetween, said plate member supporting said brackets for radial movement, said brackets having cam followers riding in said spiral grooves to rotate said disc relative to said plate in accordance with the radial movement of said brackets, and said control means being connected to brackets.

4. An apparatus as set forth in claim 3 wherein said disc is secured to a hollow shaft; said drive means is operatively connected to said hollow shaft for driving said hollow shaft; said plate is secured to a shaft journaled in said hollow shaft for rotation therein; a differential gear unit having a pair of bevel gears, a spider gear and a spider block; said spider gear journaled on said spider block; said bevel gears being freely mounted on a bar which is keyed to said spider block; said hollow shaft being operatively connected to one of said pairs of bevel gears, said shaft being operatively connected to the other of said pairs of bevel gears; and said control means being connected to said bar of said spider block.

5. An apparatus as set forth in claim 4 wherein said control means includes a potentiometer operatively connected to said drive means for regulating the speed of said drive means and the speed of said chuck means in response to the relative rotation of said disc relative to said plate member and the radial position of said bracket in said plate member.

6. An apparatus as set forth in claim 5 wherein said brackets have inflatable tubes on the outer periphery thereof, a pressurizing source, valve means operatively interconnecting said pressurizing source and said tubes for selective pressurization and deflation of said inflatable tubes for the mounting and demounting of wheel rims thereon.

7. An apparatus as set forth in claim 6 wherein carriage means supports said chuck means, and adjusting means is operatively connected to said carriage means to adjust the position of the chucks relative to said conveyor means.

8. An apparatus for use in the winding of strip material onto a wheel rim comprising chuck means, said chuck means having a plurality of radially movable jaws, inflatable tubes mounted on the outermost portion of each jaw, inflating means connected to said tubes, motive drive means connected to said chuck for rotating said chuck, and control means operatively connected to said jaws for controlling the output speed of said motive drive means in response to the radial position of said jaws relative to the rotative center of said chuck.

9. An apparatus as set forth in claim 8 wherein said chuck means includes a disc member and a plate member, said members mounted on separate shafts, said control means having a differential unit connected to said shafts, said control means including a potentiometer, and one of the outputs of said differential unit being connected to said potentiometer which controls the output of said motive drive means.

* * * * *